United States Patent
Williamson, III et al.

(10) Patent No.: US 6,577,711 B1
(45) Date of Patent: Jun. 10, 2003

(54) METHODS FOR DETECTING DEFECTIVE COMMUNICATIONS LINES

(75) Inventors: William A. Williamson, III, Stone Mountain, GA (US); William Halliburton Greer, Marietta, GA (US); Robert Franklin Jones, Snellville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/085,304

(22) Filed: May 28, 1998

(51) Int. Cl.[7] .......................... H04M 1/24; H04M 3/08; H04M 3/22
(52) U.S. Cl. ................. 379/22.03; 379/1.01; 379/9; 379/9.03; 379/12; 379/22; 379/29.09; 379/32.02
(58) Field of Search ............................ 379/1, 9, 10, 15, 379/27, 29, 32, 34, 22, 22.02, 22.03, 12, 22.07, 24, 29.09

(56) References Cited

U.S. PATENT DOCUMENTS

| | | | | |
|---|---|---|---|---|
| 4,197,427 A | * | 4/1980 | Hutcheson et al. | 379/9 |
| 4,464,543 A | * | 8/1984 | Kline et al. | 379/15 |
| 5,099,436 A | * | 3/1992 | McCown et al. | 364/550 |
| 5,790,633 A | * | 8/1998 | Kinser, Jr. et al. | 379/10 |
| 5,867,558 A | * | 2/1999 | Swanson | 379/34 |
| 5,937,033 A | * | 8/1999 | Bellows | 379/27 |

* cited by examiner

Primary Examiner—Binh Tieu
(74) Attorney, Agent, or Firm—Nora M. Tocups

(57) ABSTRACT

Methods and apparatus are disclosed for identifying defective communications lines. The method generally involves passively detecting signals symptomatic of and generated by a defective communications line rather than by a user accessing a communication network via the line. One alternative involves monitoring calls to a selected number having low digit and set values. Analysis of the pattern of calls to the selected number, or directly monitoring the frequencies upon the communications line, identify calls that are effectively generated by defects in a communications line rather than legitimate calls generated by network users. Spurious calls are associated with the originating communications line. The line can then be automatically tested or service dispatched. More automated alternatives are also disclosed that make use of switch reconfigurations. Central office switches may be programmed to detect a variety of events that indicate a spurious pulse or seizure is being generated by a communication line. The detected spurious signal is associated with its originating communications line. The line can then be flagged for service or further tested, including automatically by switch equipment, to determine whether it is defective.

18 Claims, 3 Drawing Sheets

METHODS FOR DETECTING DEFECTIVE COMMUNICATIONS LINES

The present invention relates to methods and apparatus for efficiently detecting defective communications lines within a wired communications network.

BACKGROUND OF THE INVENTION

Most people are familiar with the wired, public telephone network; they have either used telephones connected to that network or seen some of the physical elements making up the network itself, such as aerial cables, buried or underground cables or terminal boxes coupling such cables to houses or other facilities. Virtually everyone is also familiar with the general fragility of the telephone network since most people have experienced a telephone outage caused by trees falling on lines or underground cables damaged by ground shifts or inattentive diggers.

A variety of less obvious and less easily identifiable problems effect the cables that carry telecommunications, internet traffic and data communications through the public telephone network, however. For instance, corrosion at the contact between the telephone cable and a terminal, wear of the insulation surrounding the wires carrying communications, or a wet telephone cable may cause the cables to malfunction. Likewise, lightning can damage the sheath surrounding the cable and wind or water entering the splice between cables can then cause malfunctions. Problems with water entry may be particularly pronounced with older cables, which sometimes were formed using paper insulation surrounded by a lead sheath that was not impervious to water. Moreover, problems may occur even in the more benign environment inside of a building or home. Lint or other material may build within line jacks or interfaces and become sufficiently damp to inject moisture into the lines to cause shorts. Or, insulation on wires running underneath carpet or the like may become worn from constant travel. Stepping near to or on top of worn wires then causes a malfunction.

Often, malfunctions take the form of a low resistance between conductors or a conductor and ground. This is caused by water conducting within the line or a wire carrying power touching a wire that is grounded because of insulation wear or the like.

These problems occur despite extensive measures to protect the many lines that make up a telephone cable. For instance, the typical telephone cable comprises numerous lines. Each line uses a pair of copper (or other) wires. Often the wires are given a slight twist (thus, the name "twisted pair") in order to minimize interference among the communications signals the wires carry. A cable is made by stranding together several groups of wires to form the cable core. A sheath, comprising layers of aluminum, steel, lead or polyethylene, surrounds the core. The sheath provides electric shielding, water resistance and some armor against blows to the cable. These protections, however, do not always prevent entry of water, insulation wear, corrosion, cuts or other problems from causing shorts.

If the damage to the line causes a permanent short, the defective line is easily identified because it will not work at all. If, however, the short is intermittent, detecting it will be substantially more difficult, if not impossible. Customers may notice some disruption in service and report that to the telephone company. Typically, the company may dispatch a technician to try and identify the problem. Many times the technician will be unable to identify the defective cable pair or the reason for the intermittent failures. Often, it may take several customer complaints and several (expensive) trips before the technician will be able to identify and correct the problem.

Efforts have been made to more proactively identify defective lines. For instance, periodically, switches installed within the network may run an "ALIT" test. The ALIT or "Automatic Line Insulation Test," may identify some of the lines with permanent breaks or shorts. Telephone companies' service departments periodically may retroactively analyze trouble reports that record customer complaints or ALIT results to determine whether the cables or "plant" in a particular area need to be rehabilitated completely because they have aged and performance has degraded.

Some telephone companies have used a system called the Loop Cable Administration and Maintenance Operations System (called "LCAMOS" or "Predictor system") that is a corputer system that monitors and utilizes information obtained from customer reports, switch messages, and ALIT results to identify trouble areas within the telephone network. The aim of many of the switch messages received by the Predictor system is to provide information that helps protect the telecommunications switches from overload or other negative conditions. Thus, thresholds may be set such that intermittent pulses are not viewed as a triggering event that would cause the system to identify a particular cable pair or, more likely, a group of cables, as having a problem. The Predictor system reportedly correlates this data with other information so that lines with trouble messages will be tested automatically when they fall within limits of preset thresholds. Also, the Predictor system can issue reports indicating problems developing in the telephone network depending on thresholds set by the user in order to control the flow of information appearing on the report.

However, neither ALIT nor the Predictor system properly identifies particular lines or cables that are generating intermittent shorts or pulses. Dealing with these intermittent pulses by dispatching technicians every time a customer calls is very expensive. The intermittent problems or pulses may additionally prevent telephone companies from offering valuable "N11" services. "N11" services are those in which telephone users can dial a "N11" number, where N is a number from 2 to 9, and be automatically routed to one point within the telephone network. The most familiar such service in North America is the emergency 911 service, through which telephone users can immediately contact emergency services such as police, fire or ambulance units.

Many telephone companies, however, would also like to offer other N11 numbers to their clients. For instance, BellSouth Telecommunications, Inc. has offered 211 service to United Way. Anyone dialing 211 throughout a particular area, such as metropolitan Atlanta, Ga., would be immediately routed to United Way's customer calling center. Other N11 services have been contemplated or offered, including 411 service to provide telephone information; 511 service for commercial information; or 611 service for repairs.

Pulse dialing, also known as rotary dialing, interrupts the telephone line current with a series of breaks or "clicks" that are essentially shorts and opens on the line. By changing the number of breaks (or pulses) in the string over a preset period, the number being dialed can be changed. The telephone switch is designed to recognize dial pulses at the standard rate of 10 pulses per second and may recognize pulses well outside that range. If there is a single pulse, the number being dialed is "1"; if ten pulses occur, the number being dialed is "0." Offering 211 and other N11 services where "N" is a smaller number results in generation of many spurious calls by defective telephone lines that effectively dial the N11 number by means of the intermittent shorts and opens in the line caused by the defects mentioned above. These shorts and opens, which temporarily interrupt line current, may be viewed by network switches as pulse dialing signals, which the network switches interpret as actual calls by customers if the pulses are grouped and timed to resemble an actual number. Switches filter out many of these pulses, e.g., a pulse that generates a single digit, like 1, 2 or 3, or several series of pulses that generate a set of numbers less than three, like 21, 32 or 11, simply because switches are not designed to recognize those numbers as legitimate calls. But because switches are biased to complete telephone calls once they receive the correct number or set of digits, a defective communication line can generate a N11 number that is recognized by the switch and routed to any destination associated with the N11 number.

The frequency of such improperly dialed numbers declines as the "N" in the N11 service increases in value. Thus, spurious calls to a 911 number are less frequent than spurious calls to a 211 number. That simply reflects that it is less probable that a defective line will generate the required pattern of pulses to dial 911 than 211. Conceivably, a defective line could also dial other telephone numbers, although the statistical probability drops as the number of required pulses per digit and number of digits per phone number increase. Thus, while it is possible that a 222 number could be dialed, it is less likely that a defective cable could generate the pulse combinations needed to dial a 7 digit phone number.

In any event, experience has shown that the N11 numbers using lower digits like 2, 3 or 4 will generate numerous spurious calls because of the existence of defective communications lines. For example, after a particularly bad storm in one area in which 311 service was being offered to connect customers to emergency medical services, hundreds of spurious calls were generated, probably because the storm caused water to enter cables that then shorted out intermittently the communications lines, thereby generating pulses necessary for the line to effectively dial the 311 number.

Unfortunately, such calls cannot be screened out given the chance that a legitimate call may be initiated to the possibly critical (in the case of emergency services) number. The best solution is to identify and correct defective communications lines. The present methods for detecting intermittently defective communications lines are inadequate and expensive. A need accordingly exists for efficiently and quickly detecting defective cable pairs in order to correct the problems with the line and allow quality offerings of N11 or similar services using a limited number of digits that are in the lower ranges of value.

SUMMARY OF THE INVENTION

The present invention overcomes the above problems by providing methods for detecting, logging, analyzing and testing defective communications lines and, in particular, detecting lines only intermittently defective. Generally detection methods may be implemented that passively monitor for and identify signals generated by defective communications line. For example, one method involves detecting spurious communications and associating those communications with the defective communication lines that generated each particular communication. This method can be implemented in non-switched based solutions. This allows quick, efficient implementations of the method without the need for extensive reconfiguring or reprogramming of the switch by the switch manufacturer. Alternative methods for using a central office switch to monitor and identify signals symptomatic of defective communication lines are also disclosed. Such methods allow not only for more efficient detection, but may be automated and used to collect data that allows further analysis of the lines and communications network itself.

The method of the present invention aims to detect signals indicating a possible defect in a communications line. Those signals are then correlated with the line generating them. Thus, defective communications lines, which include wires, twisted pair wires and the like, are identified by recognizing spurious communications from these lines and associating them with the particular line from which they originated. "Spurious communications" means a communication, attempted communication or other signal intermittently generated by a defective communications line rather than by a user attempting to access the services provided via the communications line. By way of example, the defective communication line generates the spurious communications by shorting or otherwise seizing the line to effectively dial a digit or series of digits.

The detection step may be implemented by, for instance, defining an N11 or other selected telephone number to which all communications in a given area are routed by network switches. Defective communications lines will generate without user intervention pulses that pulse dial the selected number. Analyzing the pattern of calls to the selected number or listening to each call received by the selected number will identify whether the communication pulses are spurious and the line therefore is defective or whether the user of the line purposefully dialed the calls. Thus, the call pattern from a particular line can be analyzed to determine whether the calls are coming at odd hours and during conditions suggesting the line is defective. For instance, if the same line generates multiple calls to the chosen N11 number late at night or during inclement weather, chances are high that the line is defective and the defects are essentially causing the line to dial pulses. Alternatively, a device may physically monitor the line after a call to determine the presence of either frequencies suggesting only noise is on the line (indicating a defective line made the call) or frequencies suggesting the line carries human voice or data (indicating a user initiated the call). Either or a combination of these analyses determine whether the pulses dialed and resulting communication are, in fact, spurious.

Once a spurious communication has been identified, the communication is associated with a particular communication line. This association step may be performed by determining the originating telephone number generating the spurious call. That originating number is associated with a particular communications line; alternatively, a switch may be programmed to identify the originating equipment associated with the particular line that generated the spurious communication.

The methods of the present invention may be implemented with very few changes to the switches within a communications network. Thus, in one embodiment of the invention, switches may be configured simply to route N11 or other calls to an intercept platform. The intercept platform collects and logs call data, including the originating number, date/time, etc. of each incoming call. The logged information can be manually reviewed in order to determine which of the calls appear to be spurious and confirm their association with a particular communications line. Alternatively, the logged information can be logged into a database for automated processing and analysis.

Reprogramming the switch allows for a broader range of spurious pulses to be detected. For instance, in an alternative configuration, a central office switch may be reconfigured to detect spurious communications caused by pulses generated by defective communication lines without the need to route N11 or other calls to an intercept platform. Or, the switch can detect spurious pulses or other signals that are symptomatic of a defective line. Switches may be reprogrammed to detect the following spurious pulses: line seizures involving incompletely dialed pulses; line seizures involving pulses that do not fall within published standards for dialing pulses; line seizures involving pulses that are of unequal amplitude or whose amplitudes are not typical of that particular line; or line seizures involving pulses from lines that normally use DTMF dialing. In short, detection flexibility can be greatly expanded with firmware changes within the central office switches.

Additional programming changes allow the switch to log detected discrepancies into a database for further processing by the switch or an external device. For instance, individual switches may be configured to collect data for a certain time frame and then forward it to a master database coupled to a workstation that allows further processing and analysis. The analysis may include reviewing forwarded call detail records in order to identify spurious calls based upon identification of atypical calling patterns. Additionally, multiple spurious communications may be correlated with the geographic areas from which they each originate. Areas having a high percentage of spurious communications will inform network outside plant engineers of the possible need to update the entire plant in that geographic area or take other remedial or preventive measures to preclude further service interruptions.

The present invention accordingly aims to achieve at least one or combinations of the following objectives:

To provide a method for detecting intermittently defective communications lines within a communications networks.

To passively detect such defective communications lines by monitoring for and identifying signals symptomatic of such lines and correlating the symptomatic signals with the originating line.

To detect spurious calls generated by defective communications lines.

To detect spurious calls by determining that a particular defective communication line generated a pulse.

To detect spurious calls by analyzing calls made to a selected N11 or other low digit and set value telephone number.

To associate detected spurious calls with the defective communications line generating those calls.

To provide improved N11 services by efficiently detecting defective communications lines and thereby decreasing disruptive, illegitimate calls to the N11 service center.

To provide methods for automatically analyzing switch events in order to detect intermittently defective communications lines.

Other objects, features and advantages of the present invention will become apparent upon reading the rest of this document.

DETAILED DESCRIPTION OF THE DRAWINGS

NNN Implementation

Figure 1:
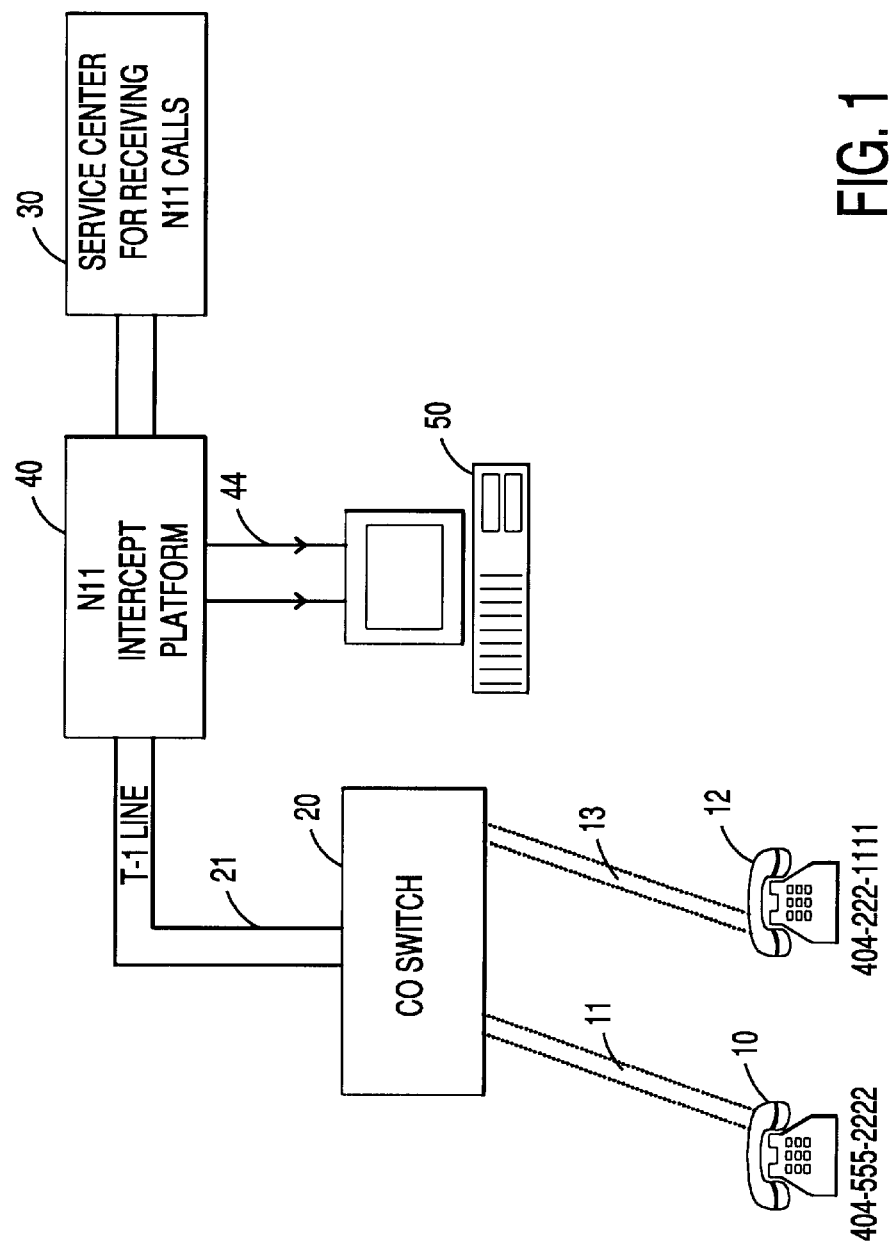
FIG. 1 shows a block diagram of a system according to the present invention that implements one method for detecting defective communications lines.

FIG. 1 shows a block diagram of portions of a communications network, such as exist in a Public Switched Telephone Network ("PSTN"). Phones 10, 12 couple to a central office switch 20 via lines 11, 13. A T-1 line 21 couples the switch 20 to a N11 service center 30. For example, switch 20 is programmed to route all users dialing a "211" or other selected N11 number to the service center 30. Service center 30 may also be configured to accept and process other selected low digit and low set value phone numbers.

A N11 intercept platform 40 may be coupled to the T-1 line 21 between switch 20 and service center 30. Platform 40 may be a T-BERD 224 with Caller ID Option manufactured by TTC (Telecommunications Techniques Corp.). Intercept platform 40 is capable of capturing various call detail records concerning calls delivered by switch 20 to service center 30. Call detail records may include at least some of the following information: caller identity information, originating number information, terminating number information and Time, Date, T1 Channel Number. These call detail records are correlated with the originating telephone number and, therefore, the line originating the communication. Periodically or continuously, the platform 40 transfers captured call detail data to a database on a workstation 50.

Intercept platform 40 is used to monitor all communications to a selected N11 number. The N11 number selected can be an actual number in-service by a particular organization, such as the 211 number for use with a charity, as described above. Alternatively, in some regions, the N11 number could be unassigned. Either way, the N11 number will receive some legitimate calls either from customers seeking the services offered if the number is assigned or from customers who inadvertently dial the unassigned N11 number. Many spurious calls, however, will result from pulses generated by communications lines that are only intermittently defective. The method of the present invention identifies the spurious calls originated by these intermittently defective communications lines and associates them with the correct generating line.

Multiple methods exist for identifying that the call originated from a defective line. First, all incoming calls can be physically monitored by an operator or a device coupled to the intercept platform 40 in order to determine whether human voice frequencies or data transfer frequencies are present once the call is connected. For example, a meter, such as a frequency selective voltmeter or spectrum analyzer, could be coupled to platform 40 to determine whether voice frequencies are present upon calls terminated to the selected N11number. Alternatively, the meter could be used to determine the presence of noise on the line, which would indicate that the call was dialed by spurious pulses. Advanced DSP (Digital Signal Processing) could also be used to automatically distinguish noise from valid signals.

Alternatively, intercept platform 40 may capture and store call detail records describing communications to service center 30 or an unassigned N11number. Those records can be monitored or analyzed to determine whether a pattern of calls to the selected N11 number is atypical. For example, referring to FIG. 1, if intercept platform 40 detects multiple calls over a short period, say one hour, from phone 10 to the selected N11 number, the probability that the calls result from spurious pulses generated by a defective communications line 11 is high. Further pattern analysis can be done to confirm this. Thus, call detail records can be supplied to workstation 50 that is coupled via lines 44 to the intercept platform 40. Workstation 50 can be programmed to flag a suspected defective line 11 or 13 if it receives a certain number of calls during a certain period of day. Thus, if phone 10 generated 5 calls to the N11 service center 30 between 1:00 and 2:00 a.m., when the service center 30 is known to be closed, then line 11 would be flagged as potentially defective. Workstation 50 may also be provided with other data, such as indications of geographic areas having inclement weather (which tends to increase the frequency of spurious pulsing from defective lines) or in which many defective lines have been previously reported that can further ensure that flagged lines have a high probability of being defective.

Part of the call detail information captured by intercept platform 40 is information on the caller originating number. For example, platform 40 could use standard caller identification firmware to detect the Calling Line Identification ("CLID") information that identifies the originating telephone number for the call being routed to the service center 30 or an unassigned N11 number. CLID information is not always supplied, however, for unlisted or blocked phones 10, 12. Thus, other methods may be used such as Automatic Number Identification ("ANI") or switch 20 features like feature group D may be implemented. Also, links to the SS7 (Signaling System 7) platform as well as BCLID (Bulk Calling Line Identification Delivery) could be used to acquire the calling line information. Various alternatives for capturing the originating number of phones 10, 12 are well known to persons skilled in this art.

The alternative shown in FIG. 1 illustrates an intercept platform 40 that may be a T-BERD (as described above) capable of monitoring all 24 channels on the T-1 line 21 or an equivalent monitoring device. Each time intercept platform 40 recognizes a seizure of a channel, it monitors and captures CLID or other originating number data. Other alternatives include using a service called "Bulk CLID," offered by network operators such as BellSouth Telecommunications. Bulk CLID couples via a modem to a PC or other computer in order to download CLID information regarding multiple lines.

In any event, once the originating number is captured, the calls dialed by spurious pulses identified by either methods described above are associated or correlated with their originating number. This is necessary in order to ensure that the appropriate line can be tested or a service technician dispatched for that line. Additionally, workstation 50 may create a list identifying the originating numbers of defective lines and can correlate them with cable and pair information. The list can be examined automatically or manually to determine whether a particular geographic area has an unusually high number of defective lines. Thus, if a number of lines served by similar cable and pairs like phone 10 were identified as defective, it may indicate the need to replace a significant amount of older wiring in the area represented by that prefix.

Figure 2:
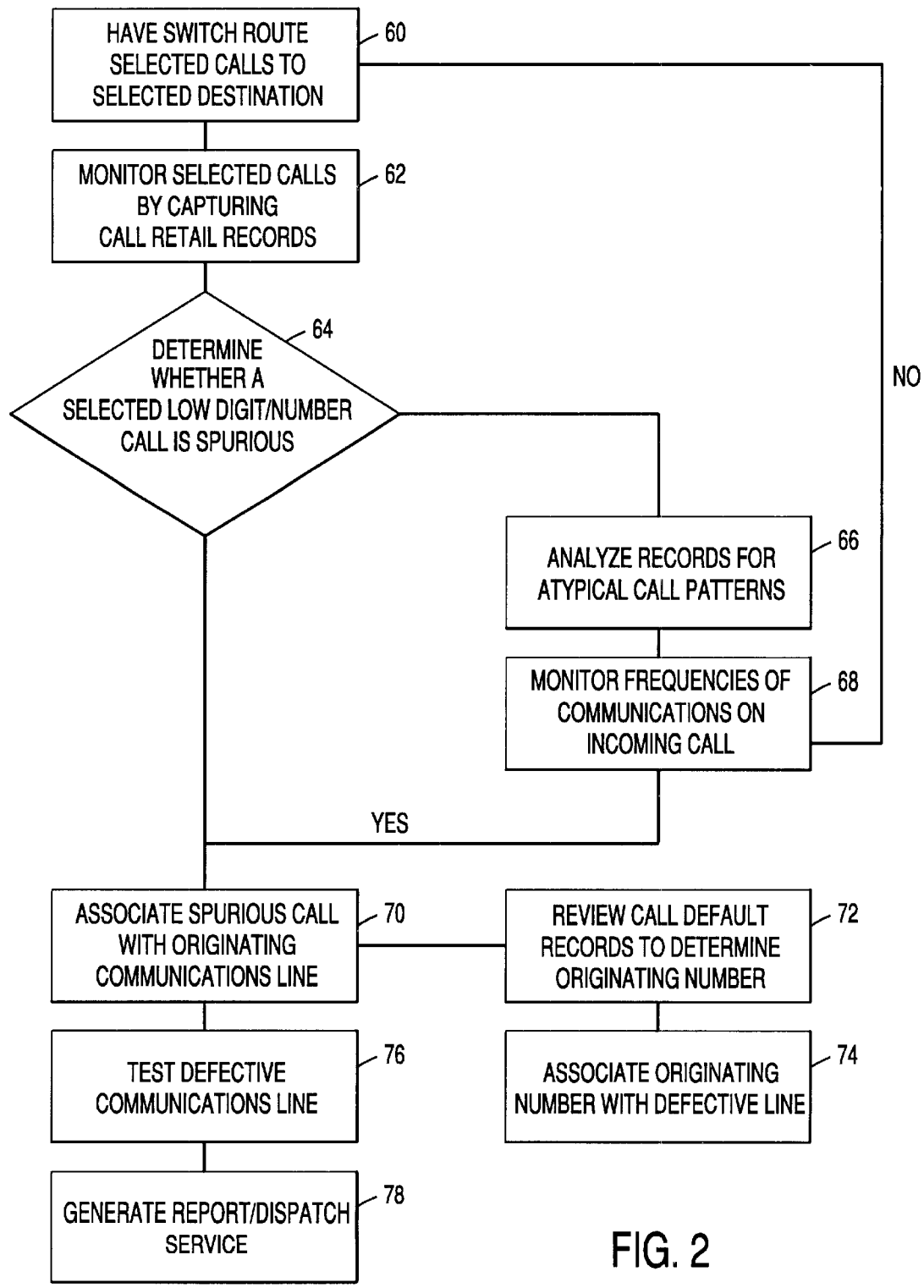
FIG. 2 is a flow chart illustrating the method of the present invention capable of performance by the system shown in FIG. 1.

FIG. 2 shows a flow chart that illustrates the steps of one method of the present invention. The first step 60 is to have a switch route calls to the selected destination. At some point in the routing, the calls to the selected destination are monitored, as shown by step 62. Monitoring includes capturing the call detail records that include the originating number information needed to associate calls generated by spurious pulses with their originating, defective lines. After collecting the information from monitoring, a determination is made at step 64 as to whether a selected call is spurious or not. This can be done either by analyzing the records to identify atypical call patterns, as in-step 66, by monitoring frequencies of communications on the incoming calls, as in step 68, or some combination of both. If a call is determined to have been generated by spurious pulses, it is associated with its originating, presumptively defective line at step 70 by reviewing Call Detail records to determine Originating numbers (step 72) and Associating Originating Number with Defective Line (step 74). At this point, switch 20 may be instructed to conduct a line test, as in step 76, such as by using an ALIT or other test. A report or service request is, in any event, generated at step 78.

Other Low Digit/Set Value Implementations

The above section describes implementation of the invention by monitoring and analyzing calls routed to low digit and set value NNN numbers, like a 3 digit. set value of NNN where N equals digits 1 to 4. However, other numbers may be selected so long as they have sufficiently low digit and set values so as to increase the statistical probability of a defective line effectively dialing such number. The NNN implementation has been described because such an implementation may be made with very few changes to the configuration and programming of switch 20, which already is programmed to route 3 digit telephone numbers. Switches 20 are accordingly now programmed to examine the first 3 digits they receive to determine a match with an NNN number in use, such as 911 for emergency services. Switches 20 can be programmed by network operators to route calls to other 3 digit numbers to specific destinations.

Nevertheless, switches 20 can be programmed to route other low digit or low set value numbers. Low digit refers to numbers wherein the digit is a low value in terms of the ease of pulse dialing. For instance, it is relatively easy for a defective line to effectively dial pulse a 1, 2 or 3 by simply having one to 3 intermittent pulses. Likewise, it is relatively easy for the same defective lines to repeat those low digit numbers to create a small set value number, such as 11, 212 or 1231, etc. As the digit value and set value increase, it becomes statistically less likely that a defective line would dial the number (although if a line does so, it may indicate serious problems in the line). Thus, the present invention may be implemented by monitoring communications to numbers selected with generally low digit and set values.

Switch Implementation

Figure 3:
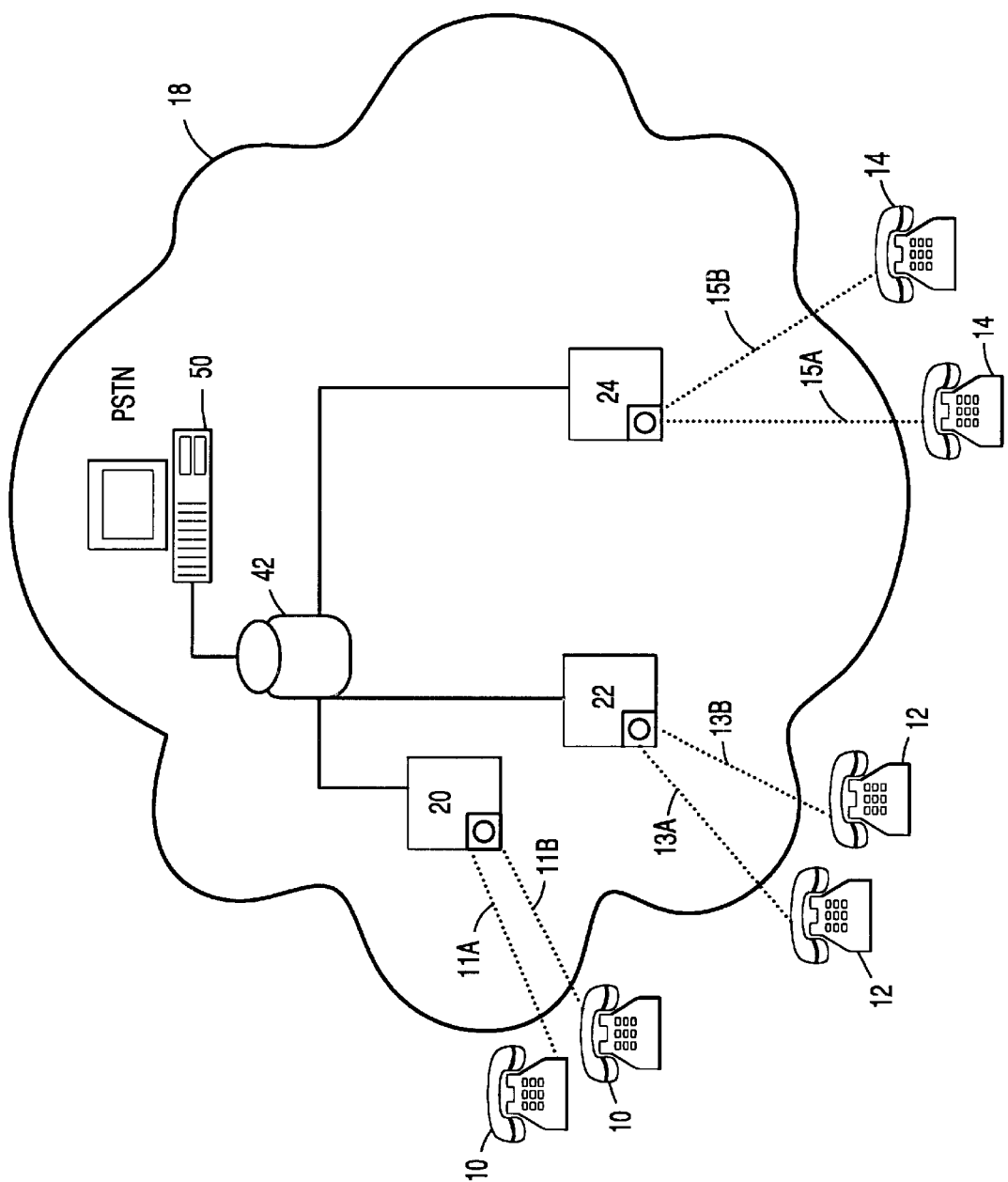
FIG. 3 is a block diagram showing a system according to the present invention that uses a central office switch to monitor for spurious pulses that identify defective communication lines.

FIG. 3 shows an alternative configuration of a system 18 capable of implementing the methods of the present invention. FIG. 3 shows in block form a number of central office switches 20, 22, 24 couple to various phones 10A, 10B, 12A, 12B, 14A and 14B via lines 11A, 11B, 13A, 13B, 15A and 15B. A database 42 may be coupled to the switches 20, 22, and 24, as well as a workstation 50.

One problem with detecting defective communications lines by monitoring calls to a selected low digit and set value number is that some intermittently defective communications lines, may not generate the required sequences or pulses. These lines may, however, be generating numerous spurious pulses that are rejected by the switch as insufficient to dial a number, either because the call is incomplete in terms of digits dialed or because the pulses do not meet certain standards. Today, many invalid dialed sequences are routed to some form of treatment, i.e. a tone or an announcement. These calls are not service affecting, but the information is not used to identify problems. To implement an alternative method designed to detect these ordinarily rejected signals that reflect potentially intermittently defective communications lines, switches 20, 22 and 24 have been programmed to record call detail information about any of the following spurious pulse events:

- incompletely dialed pulses;
- pulses that do not fall within published standards for dialing pulses;
- pulses that are of unequal amplitude or whose amplitudes are not typical of that particular line; or
- dial pulses on line typically using DTMF.

These events are all characteristic of an intermittently defective communication line. Switches 20, 22 and 24 may be programmed to detect these events and either individually store the events and associated information such as call originating information or to forward it to a database 42. Workstation 50 may then be used to analyze the collected data to implement pattern analyses that will identify those calls generated by spurious pulses. The pattern analysis may be based upon a combination of the history of calls at that switch or from the lines at issue, pre-set standards for pulse and dialing characteristics or the frequency of the detected events over defined time periods.

The foregoing is provided for purposes of explanation and disclosure of preferred embodiments of the present invention. For instance, numerous combinations of telephone numbers may be chosen to create a selected number and other characteristics of intermittently defective lines may be identified and monitored for. Further modifications and adaptations to the described embodiments will be apparent to those skilled in the art and may be made without departing from the scope or spirit of the invention and the following claims.

What is claimed is:

1. A method for passively detecting an intermittently defective communications line within a communications network, the method comprising the steps of:
    a) monitoring for and identifying at least one signal symptomatic of an intermittently defective communications line, wherein the at least one signal comprises at least one of the following:
        (i) communications line seizures wherein a complete telephone number is not dialed;
        (ii) pulses whose characteristics do not meet selected threshold parameters;
        (iii) pulses appearing on a communications line normally using DTMF signaling; and
        (iv) pulses of unequal amplitude or whose amplitude are not typical of that particular line; and
    b) correlating the at least one signal with an identifier describing the intermittently defective communications line.

2. A method according to claim 1 in which the at least one signal comprises a spurious communication generated by the defective communications line.

3. A method according to claim 2 in which the monitoring step comprises the steps of monitoring communications to a selected number and the identifying step comprises the step of determining through pattern analysis that a particular communication was spurious.

4. A method according to claim 3 in which the pattern analysis is based upon a combination of a history of calls obtained from the communications line, pre-set standards for pulse and dialing characteristics, or frequency of detected events over defined time periods.

5. A method for passively detecting an intermittently defective communications line within a communication network, the method comprising the steps of:
    a) monitoring for and identifying at least one signal symptomatic of an intermittently defective communications line by programming a switch to identify the at least one signal, which is selected from the group consisting of the following signals:
        (i) communications line seizures wherein a complete telephone number is not dialed;
        (ii) pulses whose characteristics do not meet selected threshold parameters;
        (iii) pulses appearing on a communications line normally using DTMF signaling; and
        (iv) pulses of unequal amplitude or whose amplitude are not typical of that particular line; and
    b) correlating the at least one signal with an identifier describing the intermittently defective communications line.

6. A method for improving communication services by detecting defective communications lines within a communications network, in which the method comprises the steps of:
    a) identifying spurious pulses intermittently generated by a particular defective communications line, wherein the spurious pulses correspond to at least one of the following:
        (i) communications line seizures wherein a complete telephone number is not dialed;
        (ii) pulses whose characteristics do not meet selected threshold parameters;
        (iii) pulses appearing on a communications line normally using DTMF signaling; and
        (iv) pulses of unequal amplitude or whose amplitude are not typical of that particular line; and
    b) associating the spurious pulses with an identifier associated with the line that generated the spurious pulses.

7. A method according to claim 6 in which the identification step comprises the step of configuring the switch to detect events that coincide with spurious pulses.

8. A method for improving communication services by detecting defective communications lines within a communications network, in which the method comprises the steps of:
    a) identifying spurious pulses intermittently generated by a particular defective communications line by configuring a switch to detect events that coincide with the spurious pulses, wherein the events are from the group consisting of:
        (i) communications line seizures wherein a complete telephone number is not dialed;
        (ii) pulses whose characteristics do not meet selected threshold parameters;
        (iii) pulses appearing on a communications line normally using touch tone signaling; and
        (iv) pulses of unequal amplitude or whose amplitude are not typical of that particular line; and
    b) associating the spurious pulses with an identifier associated with the line that generated the spurious pulses.

9. A method according to claim 6 in which the identification step comprises the step of monitoring the communications line associated with each of the events to determine absence or presence of selected frequencies upon the line.

10. A method according to claim 6 in which the association step comprises the steps of:
   a) configuring a central office switch to capture call detail records, including identifier data describing origination of terminating communications to be routed to a selected number; and
   b) correlating a detected spurious pulse with the origination data.

11. A method according to claim 6 in which the identification step comprises the steps of:
   a) defining a selected number to which terminating communications are routed by the communication network; and
   b) analyzing the terminating communications to identify spurious communications.

12. A method according to claim 11 in which the defining step comprises the step of selecting an N11 number wherein N is a number from 2 to 5.

13. A method according to claim 11 which the defining step comprises the step of selecting a number having a digit value between 1 and 4 and a set value less than 5.

14. A method according to claim 11 in which the analyzing step comprises the step of reviewing data describing multiples of the terminating communications to determine atypical patterns of communication to the selected number.

15. A method according to claim 14 further comprising the step of capturing data describing the multiples of the terminating communications.

16. A method according to claim 15 in which the capturing step comprises the step of monitoring terminating communications to the selected number to capture call detail records, including data describing the origination of each of the terminating communications.

17. A method according to claim 11 further comprising the step of determining the absence or presence of signals selected from the group consisting of human voice frequency, data signal, a facsimile signal and a noise signal.

18. A method according to claim 6 further comprising the step of testing a communications line associated with a particular spurious communication.

* * * * *